United States Patent Office 2,836,558
Patented May 27, 1958

2,836,558

METHOD OF INHIBITING CORROSION OF METALS

William B. Hughes, Tulsa, Okla., assignor to Cities Service Research and Development Company, New York, N. Y., a corporation of New Jersey No Drawing. Application May 17, 1954
Serial No. 430,451

6 Claims. (Cl. 252—8.55)

This invention relates to the prevention of corrosion, and is more particularly concerned with improved compositions and processes for treating natural oil-brine mixtures to reduce their corrosive action on production, transmission, storage, and other oil field equipment.

It is a well-known fact that many oil producing formations yield with the crude oil a brine which is extremely corrosive in its action on metal tubing, casing, pump and other oil producing and collection equipment, and that this type of corrosion is particularly noticeable in wells producing brines containing dissolved hydrogen sulfide, carbon dioxide, or other acidic materials. The problem is also complicated by the fact that the corrosive nature of the brine will vary from well to well, and corrosion inhibiting compositions which are effective at one location are not necessarily effective at another.

Various compositions have been proposed in the past for inhibiting corrosion in oil wells, of varying degrees of effectiveness. Some of these have been found to have excellent inhibiting characteristics, but have been found in some locations to promote the formation of tight emulsions which are difficult to break. Consequently, such compositions cannot be economically used at such locations.

It is an object of this invention to provide a series of compositions which are effective to inhibit corrosion even when present in the well fluids in extremely minute quantities.

It is a further object of this invention to provide a series of corrosion-inhibiting compositions which do not promote the formation of emulsions.

I have found that compositions having the above desirable characteristics may be produced by reacting a 1,3 diamine with an equimolar quantity of an aldehyde or ketone according to the method described by Riebsomer (J. Org. Chem. 15–245) to produce a hexahydropyrimidine of the generic formula

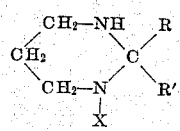

in which X is the amine residue, and R may be hydrogen or a hydrocarbon radical, R' is a hydrocarbon radical, and R and R' together are the aldehyde or ketone residue.

The reaction is carried out by mixing equimolar quantities of the reagents, adding benzene to increase the fluidity of the mixture, and to help carry overhead the water formed in the reaction, and refluxing, while trapping out water taken overhead and returning condensed benzene to the reaction vessel, until a quantity of water corresponding to the carbonyl oxygen has been taken overhead.

In order to evaluate the effectiveness of my new compositions in combatting corrosion, the following procedure was adopted. To a one liter Erlenmeyer flask 600 ml. of a 5% aqueous sodium chloride solution and 400 ml. of depolarized kerosene was added. A steel strip was then suspended in the liquid by means of a glass hook through a rubber stopper in such a manner that half of the strip was in contact with the kerosene, and the other half in contact with the aqueous layer.

The stopper was also equipped with a gas inlet and outlet line. Natural gas or nitrogen was then blown through the liquid for about one hour, in order to purge an oxygen present, and the inhibitor was added. Hydrogen sulfide was then blown through the liquid until it was saturated, and the flask was then sealed and allowed to stand for 48 hours. The steel strip was then removed, cleaned, and weighed to determine the weight loss due to corrosion. In all cases duplicate tests were run to determine the weight loss of strips subjected to the action of uninhibited liquids and thus determine the effectiveness of the corrosion inhibitor.

The following tables show test results on a number of my new hexahydropyrimidine compositions. Table I shows the reagents employed in preparing the test compounds, and the values for X, R, and R' in the generic formula given above. Table II gives the test results on each of these compounds. In all cases percentage corrosion is the weight loss of the strip exposed to the inhibited fluids divided by the weight loss of a strip exposed to uninhibited fluids under the same conditions. P. p. m. indicates the concentration of the inhibitor in parts per million of the inhibitor. Duomeen is a mixture 1,3 diamines derived from tallow fatty acids of from 16 to 18 carbon atoms. Blanks indicate no tests were run at the particular concentration.

Table I

| Compound | Amine | Carbonyl | X | R | R' |
|---|---|---|---|---|---|
| 1 | 1,3 propylene diamine | Heptaldehyde | H | H | —$C_6H_{13}$ |
| 2 | Duomeen | Butyraldehyde | $C_{16}$–$C_{18}$ hydrocarbon radical | H | —$C_3H_7$ |
| 3 | do | Benzaldehyde | do | H | —$C_6H_5$ |
| 4 | do | Heptaldehyde | do | H | —$C_6H_{13}$ |
| 5 | do | Methyl ethyl ketone | do | —$CH_3$ | —$C_2H_5$ |
| 6 | do | Acetone | do | —$CH_3$ | —$CH_3$ |
| 7 | do | Acetophenone | do | —$CH_3$ | —$C_6H_5$ |
| 8 | do | Methyl n-amyl ketone | do | —$CH_3$ | —$C_5H_{11}$ |

Table II

| Compound | Percent corrosion | | |
|---|---|---|---|
| | 25 p. p. m. | 10 p. p. m. | 5 p. p. m. |
| 1 | 2.1 | | |
| 2 | 1.3 | 3.4 | 34.8 |
| 3 | 0.7 | 7.5 | 58.7 |
| 4 | 0.9 | 5.8 | 49.9 |
| 5 | 0.2 | 3.2 | |
| 6 | 2.4 | 5.7 | 16.9 |
| 7 | 4.0 | 5.4 | 39.9 |
| 8 | 0.2 | 3.2 | 19.5 |

It may be seen from the foregoing that my new inhibitors are extremely efficient in reducing corrosion even when used in concentrations as low as 10 p. p. m., and that some, such as 6 and 8, are quite effective in concentrations as low as 5 p. p. m. A number of the new compositions have been field tested with excellent results, and show no tendency to promote the formation of emulsions. I am aware that tetrahydropyrimidines have been heretofore proposed by Blair in U. S. Patent 2,640,029 for use as corrosion inhibitors. While at first blush there would appear to be little difference between the Blair compounds and the compounds of the present invention, in field tests their properties have been found to be quite different. For example, in the Kansas oil fields, particularly at the Bemis pool, which produces a highly corrosive oil-brine mixture, the Blair compounds, even when used in concentrations as low at 10 p. p. m., promote the formation of the emulsions to such as extent as to render them commercially unusable, whereas my new compound gives no trouble even when used in amounts far in excess of that required to control corrosion. Why this should be is not known, unless the unsaturated structure of the Blair compounds reacts with some component of the well fluids to form a compound effective to emulsify the oil and brine. In any event, it is believed that the difference in properties between the two classes of compounds is rather surprising in view of their somewhat similar structure.

While the foregoing disclosure has been limited to the hexahydropyrimidines themselves, it has also been found that salts of these structures, formed by electronic neutralization with oleic acid, are also excellent corrosion inhibitors, and in some instances it may be found preferable to use the oleates because of their lower cost per pound. Test results on some typical oleates may be found in the following table.

Table III

| Compound | Mols acid | Percent corrosion | |
|---|---|---|---|
| | | 25 p. p. m. | 10 p. p. m. |
| 2 | 1 | 1.9 | 9.2 |
| 2 | 2 | 6.7 | 11.5 |
| 1 | 2 | 4.0 | |

In using my improved compositions for protecting oil well tubing, casing, and other equipment which comes in contact with the corrosive oil-brine production, I find that excellent results may be obtained by injecting an appropriate quantity of a selected composition into a producing well so that it may mingle with the oil-brine mixture and come into contact with the casing, tubing, pump, and other producing equipment. I may, for example, introduce the inhibiting composition into the top of the casing, thus causing it to flow down into the well and thence back through the tubing, etc. In general, I have found that this procedure suffices to inhibit corrosion throughout the entire system of production and collection, including field tankage.

Having now described my invention, what is claimed is:

1. The process of reducing corrosion of metals when exposed to corrosive oil well brines which comprises incorporating into corrosive oil well fluids a small but sufficient quantity of a compound selected from the group consisting of hexahydropyrimidines having the generic formula

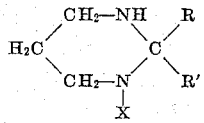

in which X and R are selected from the group consisting of hydrogen atoms and hydrocarbon radicals, and R' is a hydrocarbon radical, and oleate salts thereof, and thereafter causing the well fluids to flow in contact with the metal to be protected.

2. The process according to claim 1 in which X and R are hydrogen atoms, and R' is —$C_6H_{13}$.

3. The process according to claim 1 in which X is a hydrocarbon radical of 16 to 18 carbon atoms, R is a hydrogen atom, and R' is —$C_3H_7$.

4. The process according to claim 1 in which X is a hydrocarbon radical of 16 to 18 carbon atoms, R is —$CH_3$ and R' is —$C_2H_5$.

5. The process according to claim 1 in which X is a hydrocarbon radical of 16 to 18 carbon atoms, and R and R' are —$CH_3$.

6. The process according to claim 1 in which X is a hydrocarbon radical of 16 to 18 carbon atoms, R is —$CH_3$, and R' is —$C_5H_{11}$.

References Cited in the file of this patent
UNITED STATES PATENTS 2,640,029  Blair et al. _____ May 26, 1953
2,675,381  Craig et al. _____ Apr. 13, 1954

OTHER REFERENCES

Riebsomer et al.: The Synthesis of Hexahydropyrimidines—article in the Journal of Organic Chemistry, vol. 15, pages 245 to 248 (1950).